(12) United States Patent
Hosamani et al.

(10) Patent No.: US 10,446,040 B2
(45) Date of Patent: Oct. 15, 2019

(54) SAFE SPEED ADVISORIES FOR FLIGHT DECK INTERVAL MANAGEMENT (FIM) PAIRED APPROACH (PA) SYSTEMS

(71) Applicant: HONEYWELL INTERNATIONAL INC., Morris Plains, NJ (US)

(72) Inventors: Umesh Hosamani, Karnataka (IN); Prashanth Thirumalaivenjamur, Karnataka (IN); Abdur Rab, Karnataka (IN); Raghu Shamasundar, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/863,014

(22) Filed: Jan. 5, 2018

(65) Prior Publication Data
US 2019/0213890 A1     Jul. 11, 2019

(51) Int. Cl.
*G08G 5/02*     (2006.01)
*G08G 5/00*     (2006.01)
(Continued)

(52) U.S. Cl.
CPC .............. *G08G 5/006* (2013.01); *B64D 45/08* (2013.01); *G08G 5/0021* (2013.01); *G08G 5/02* (2013.01);
(Continued)

(58) Field of Classification Search
CPC ........ G08G 5/00; G08G 5/006; G08G 5/0021; G08G 5/0078; G08G 5/0008;
(Continued)

(56) References Cited

U.S. PATENT DOCUMENTS

| 6,177,888 B1 | 1/2001 | Cabot et al. |
| 6,703,945 B2 | 3/2004 | Kuntman et al. |

(Continued)

FOREIGN PATENT DOCUMENTS

EP     2693417 A2     7/2013

OTHER PUBLICATIONS

McCollum, Marlis, "Paired Approach in a Suitcase" Integrates FAA and MITRE Capabilities, Nov. 2014, printed from https://www.mitre.org/publications/project-stories/paired-approach-in-a-suitcase-integrates-faa-and-mitre-capabilities on Nov. 16, 2017.

(Continued)

*Primary Examiner* — Benyam Haile
(74) *Attorney, Agent, or Firm* — Lorenz & Kopf, LLP

(57) ABSTRACT

Technologically improved Flight Deck Interval Management Paired Approach (FIMPA) system and methods are provided that provide safe speed guidance to a trail aircraft. The FIMPA system comprises a processor operatively coupled to a memory and a database of aircraft-specific parameters. The processor is configured to: receive instantaneous target traffic state data; receive instantaneous state data of a trail aircraft; process the state data, target traffic state data, and aircraft-specific parameters to determine a safe speed zone to perform paired approach, and a recommended speed; render, on a cockpit display, a paired approach bar (PAB) with indicators for (i) a current location of the target traffic, (ii) a current trail aircraft speed, and (iii) the recommended speed; and wherein the indicators are separate and visually distinguishable from each other; determine a wake risk area; and render the wake risk area in a visually distinguishable manner on the PAB.

15 Claims, 7 Drawing Sheets

(51) Int. Cl.
  *B64D 45/08* (2006.01)
  *G01C 23/00* (2006.01)
  *G01S 13/95* (2006.01)
  *G01S 13/93* (2006.01)
(52) U.S. Cl.
  CPC ............ *G08G 5/025* (2013.01); *G01C 23/00* (2013.01); *G01C 23/005* (2013.01); *G01S 13/9303* (2013.01); *G01S 13/953* (2013.01); *G08G 5/00* (2013.01); *G08G 5/0078* (2013.01)
(58) Field of Classification Search
  CPC .. G08G 5/0013; G08G 5/0039; G08G 5/0043; G08G 5/025; G08G 5/02; G01C 23/005; G01S 13/9303; G01S 13/953
  See application file for complete search history.

(56) References Cited

U.S. PATENT DOCUMENTS

| | | | |
|---|---|---|---|
| 9,037,319 B2 | 5/2015 | Conner et al. | |
| 9,466,220 B2 | 10/2016 | Alekseev et al. | |
| 2002/0089432 A1* | 7/2002 | Staggs | G01C 23/00 340/945 |
| 2003/0222795 A1* | 12/2003 | Holforty | B64D 43/00 340/968 |
| 2014/0249701 A1 | 9/2014 | Latsu-Dake et al. | |
| 2014/0300495 A1 | 10/2014 | Scheu et al. | |
| 2015/0054664 A1* | 2/2015 | Dupont De Dinechin | G01C 23/00 340/973 |
| 2015/0120177 A1 | 4/2015 | Palanisamy et al. | |

OTHER PUBLICATIONS

Domino et al., Paired Approaches to Closely Spaced Runways: Results of Pilot and ATC Simulation, 2014 IEEE/AIAA 33rd Digital Avionics Systems Conference (DASC), Oct. 5, 2014.

Savita et al., Procedures for Off-Nominal Cases: Very Closely Spaced Parallel Runway Operations, 2008 IEEE/AIAA 27th Digital Avionics Systems Conference (DASC), Oct. 26, 2008.

\* cited by examiner

SAFE SPEED ADVISORIES FOR FLIGHT DECK INTERVAL MANAGEMENT (FIM) PAIRED APPROACH (PA) SYSTEMS

TECHNICAL FIELD

The present invention generally relates to mobile platform guidance systems, and more particularly relates to flight deck interval management (FIM) paired approach (PA) systems.

BACKGROUND

Closely Spaced Parallel Runways (CSPR) have historically been defined as parallel runways spaced less than 4300 ft. apart, but at least 700 ft. apart. When visual approaches can be conducted, simultaneous arrivals to CSPR are permissible. In visual approaches, simultaneous arrivals to CPSR require that flight crews on both aircraft maintain a visual separation. Runways spaced less than 2500 ft. apart have an additional requirement that flight crews must be aware of wakes produced by neighbor aircraft, and avoid wake encounters (typically by staying above or ahead of the wake of the neighbor aircraft).

When conditions do not permit CSPR visual approaches, instrument approach procedures (IAPB) may be utilized. However, the instruments may have surveillance uncertainties; for example, the angular nature of Instrument Landing System (ILS) localizer guidance may be between 3° and 6° degrees. The uncertainties may compound when used together, such that the two ILS localizers overlap somewhere on the extended final approach, degrading the resolution of the aircraft's position, and the accuracy as distance from the runway increases. As a result, increased separations may be required, which reduces the airport capacity.

To increase capacity during CSPR using the IAP, a flight deck-based solution called Paired Approach procedure (PA) is a standard regulatory solution. The PA procedure is a cooperative procedure enabling instrument dependent approaches to closely spaced parallel runways (CSPR) down to Category I minima (a Category 1 minima is one of several instrument landing system (ILS) categories for providing horizontal and vertical guidance for an aircraft during landing). The PA procedure leverages data from the Automatic Dependent Surveillance-Broadcast (ADS-B) out for the lead aircraft, received by the ADS-B in of the trail aircraft. When two aircraft on CSPR approaches are 'paired', Air Traffic Control (ATC) issues a required ASG (assigned spacing goal) to the "trail" aircraft, which is a position within a safe distance (free from turbulence) relative to the 'target' aircraft. The trail aircraft has to maintain this position, adding a new task to the pilot's already demanding approach duties. In addition to maintaining the ASG, from the start of the IAP until touchdown, the relative along-track position of the trail aircraft must remain within a forward and rear boundary that avoids an encounter with a wake vortex from the target aircraft.

Accordingly, improvements to paired approach (PA) systems are desirable. Specifically, technologically improved PA systems and methods that provide easily comprehensible, current, visual guidance distinguishing wake boundaries and speed boundaries are desirable. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method for a paired approach (PA) procedure in a trail aircraft. The method comprising: receiving instantaneous target traffic state data from an automatic dependent surveillance-broadcast; receiving instantaneous state data of the trail aircraft from a navigation system; obtaining aircraft-specific parameters from a database; processing the state data, target traffic state data, and aircraft-specific parameters to determine a safe speed zone to perform paired approach, and a recommended speed for the trail aircraft; rendering, on a display system, a paired approach bar (PAB) with indicators for (i) a current location of the target traffic, (ii) a current trail aircraft speed, and (iii) the recommended speed for the trail aircraft; and wherein the indicators are separate and visually distinguishable from each other; determining a wake risk area; and rendering, on the PAB, a visually distinguishable indicator for the wake risk area.

In addition, a system for flight interval management paired approach (FIMPA) is provided. The system comprising: a database comprising aircraft-specific parameters; a memory; and a processor operatively coupled to the memory and the database, the processor configured to: receive instantaneous target traffic state data; receive instantaneous state data of a trail aircraft; process the state data, target traffic state data, and aircraft-specific parameters to determine a safe speed zone to perform paired approach, and a recommended speed; render, on a cockpit display, a paired approach bar (PAB) with indicators for (i) a current location of the target traffic, (ii) a current trail aircraft speed, and (iii) the recommended speed; and wherein the indicators are separate and visually distinguishable from each other; determine a wake risk area; and render the wake risk area in a visually distinguishable manner on the PAB.

Also provided is an aircraft, comprising: an automatic dependent surveillance broadcast (ADS-B) system; a navigation system providing trail aircraft current state data; a datalink system providing air traffic control paired approach commands; and a system for flight interval management paired approach (FIMPA), coupled to the ADS-B system, the navigation system, and the datalink system, the FIMPA system configured to: receive instantaneous target traffic state data from the ADS-B system; receive instantaneous state data of a trail aircraft; process the state data, target traffic state data, and aircraft-specific parameters to determine a safe speed zone to perform paired approach, and a recommended speed; render, on a cockpit display, a paired approach bar (PAB) with indicators for (i) a current location of the target traffic, (ii) a current trail aircraft speed, and (iii) the recommended speed; and wherein the indicators are separate and visually distinguishable from each other; determine a wake risk area; and render the wake risk area in a visually distinguishable manner on the PAB.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

Figure 3:
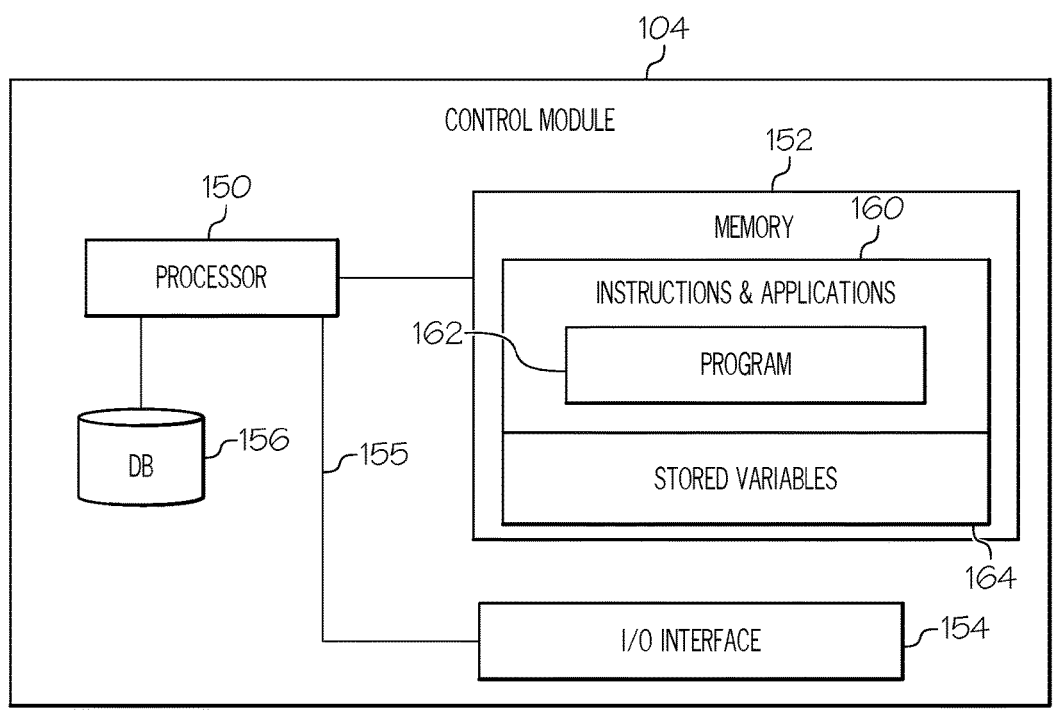
FIG. 3 is a block diagram of a control module, in accordance with an exemplary embodiment.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module, and may be separate from, or integrated within, a preexisting mobile platform guidance system, avionics system, flight management system (FMS), or aircraft flight control system (FCS). FIG. 3 provides an example control module 104 for performing the herein described functionality.

Figure 2:
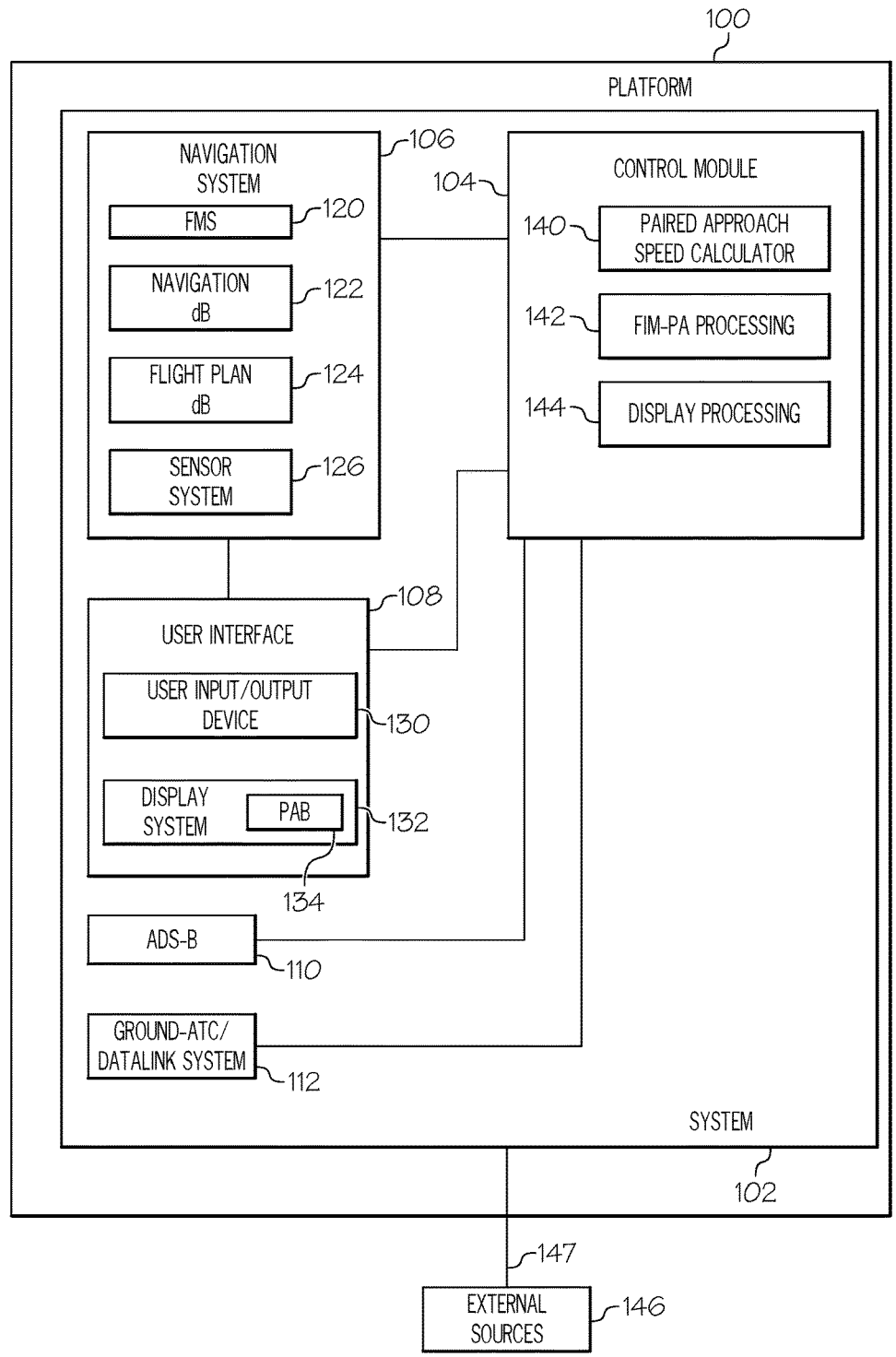
FIG. 2 is a functional block diagram of an FIMPA system, in accordance with an exemplary embodiment.

Exemplary embodiments of the disclosed flight deck interval management paired approach (FIMPA) system 102 and control module (FIG. 2, 104) determine various speed boundaries and wake boundaries during paired approach (PA) procedures, and generate corresponding display commands to render and update a paired approach bar (PAB) (FIG. 2, 134) on a display system (FIG. 2, 134). The system 102 processes aircraft-specific parameters with current state data for both the target and trail aircraft to generate the features of the PAB 134. With the herein described speed determinations, display features, and some of the additional features described below, the control module 104 delivers a technological improvement over many available paired approach guidance systems. These features and additional functionality are described in more detail below.

Figure 1:
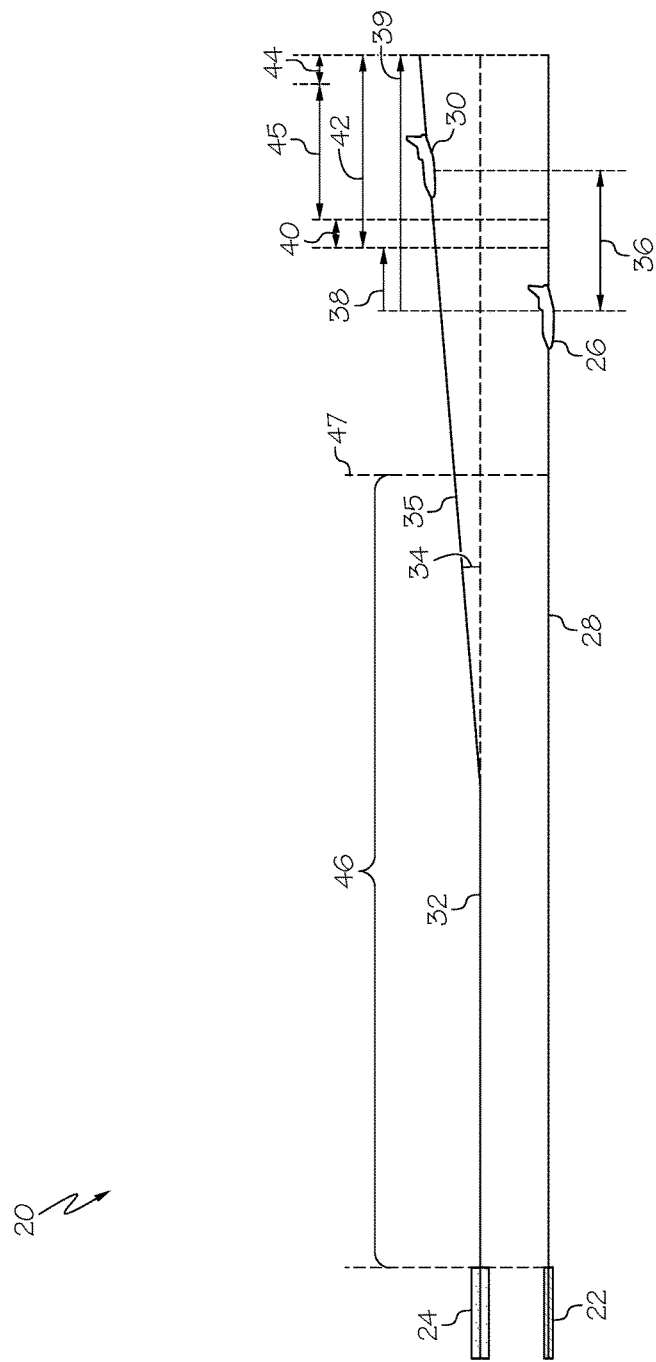
FIG. 1 is a drawing depicting closely spaced parallel runways, and determinations made in accordance with various exemplary embodiments.

As illustrated in FIG. 1, image 20 depicts two closely spaced parallel runways (CSPR): a first runway 22 and a second runway 23. Target aircraft 26 is flying a target trajectory 28 that is a straight-in ILS approach to runway 22. A trail aircraft 30 is on trail trajectory 35, which is a 3 degree (34) offset approach from a straight-in approach 32 to runway 24.

The paired approach (PA) separation standard has two components measured from the target aircraft 26: the collision safety limit (CSL 38) and the wake safety limit (WSL 39). Both of these limits represent along-path projections of the required separation measured relative to the target aircraft 26. These limits bound a safe zone 42. The trail aircraft 30 is deemed safely separated if it remains in the safe zone 42. Air Traffic Control (ATC) will generally issue commands sufficient to vector target aircraft 26 and trail aircraft 30 to their respective initial approach fixes (IAF) of their respective initial approach procedures (IAP) within an interval management (IM) initiation time/distance tolerance. One component of IM is the required ASG 36. As can be seen, the ASG 36 is within the safe zone 42.

The FIMPA system 102 further decomposes the safe zone 42 into a normal operating zone 45 and two non-transgression zones (NTZ): collision NTZ 40 and wake NTZ 44. The FIMPA system 102 processes current state data and aircraft-specific parameters and generates therefrom FIMPA speed guidance comprising a PA speed profile, with speed advisories marking the collision NTZ 40 and the wake NTZ 44. The generated FIMPA speed guidance demark a wake free zone (the safe zone 42), and speeds at which the trail aircraft 30 may impede on either of the collision NTZ 40 and wake NTZ 44. The FIMPA system 102 commands the display system 132 to render the FIMPA speed guidance in a visually distinguishable manner, as is described in connection with FIGS. 4-7.

At the planned termination point 47 (expected to be the final approach fix (FAF) for most situations), the PA procedure and associated FIMPA speed guidance are terminated for the remainder of the approach. This segment is referred to as the "open-loop segment" 46 of a paired approach (PA) procedure. At the planned termination point 47, the trail aircraft 30 slows to final approach speed and follows normal instrument approach procedures (IAP) for the remainder of the approach.

FIGS. 2 and 3 depict a functional block diagram for implementing an exemplary enhanced FIMPA system 102 and control module 104. In the described embodiments, the platform 100 is an aircraft (referred to as aircraft 100), and the control module 104 and the system 102 are within the aircraft 100; however, the concepts presented herein can be deployed in a variety of mobile platforms, spacecraft, and the like. Accordingly, in various embodiments, the control module 104 may reside elsewhere and/or enhance part of larger avionics management system, or platform management system. Further, it will be appreciated that the system 102 may differ from the embodiment depicted in FIG. 2.

The control module 104 performs the functions of: paired approach speed calculations 140, FIM-PA processing 142, and display processing 144. In order to perform these functions, the control module 104 may be operationally coupled to: a Navigation System 106, a user interface 108, a transponder for communicating with neighbor traffic, such as, an automatic dependent surveillance broadcast (ADS-B) system 110, and a transponder for communicating with ground and/or air traffic control (ATC), such as, a datalink system 114. The operation of these functional blocks is described in more detail below.

The navigation system 106 processes input from its components to (i) determine an aircraft instantaneous position with respect to a flight plan, and to (ii) provide vertical and lateral guidance for the aircraft 100 along the flight plan. The navigation system 106 may also process the flight plan and position determining data to determine a current phase of flight. To provide this data and information, the navigation system 106 generally comprises a processing system called a flight management system (FMS) 120, operationally coupled to a navigation database 122, a flight plan database 124, and a sensor system 126. As used herein, "navigation data" from the navigation system 106 may comprise data and information from the navigation system 106 and/or any of its components, such as, but not limited to, (trail) aircraft instantaneous, current state data and (trail aircraft) current phase of flight information.

The navigation database 122 may comprise waypoint information, airport features information, runway position and location data, holding patterns, flight procedures, approach procedures, and various flight planning and distance measuring rules and parameters. The flight plan database 124 is a database that contains flight plans and flight plan information, for example, a series of waypoints and associated constraints such as altitudes, airspeeds etc. Generally, before flight, the aircraft 100 is assigned a flight plan (FP); it may be programmed or uploaded into the flight plan database 124.

The sensor system 126 comprises sensors for determining instantaneous current position for the aircraft 100. The instantaneous current position of a platform or aircraft 100 may be referred to as aircraft state data, and/or position determining data, and comprises the current latitude, longitude, heading, and the current altitude (or above ground level) for the aircraft 100. Aircraft state data may also include airspeed. The means for ascertaining current or instantaneous aircraft state data for the aircraft 100 may be realized, in various embodiments, as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 106, as will be appreciated in the art.

A user interface 108 comprises one or more user input/output devices 130 and one or more display systems 132, described below. The user interface 108 is cooperatively configured to allow a user (e.g., a pilot, co-pilot, or crew member) to interact with the display system 132, the navigation system 106, and/or other elements of the system 102 in a conventional manner. In various embodiments, the user interface 108 additionally comprises an audio system for receiving voice commands and/or emitting audible alerts.

In general, the display system 132 may include any device or apparatus, and associated software, suitable for displaying (also referred to as rendering) flight information or other data associated with operation of the aircraft 100 in a format viewable by a user. The renderings of the display system 132 are often called "cockpit displays" or "images." Employed display devices may provide three dimensional or two-dimensional map images, and may further provide synthetic vision imaging. Accordingly, a display device responds to a respective communication protocol that is either two- or three-dimensional, and may support the overlay of text, alphanumeric information, or visual symbology on a given map image. Non-limiting examples of such display devices include cathode ray tube (CRT) displays, and flat panel displays such as LCD (liquid crystal displays) and TFT (thin film transistor) displays. In practice, the display system 132 may be part of, or include, a primary flight display (PFD) system, a multi-function display (MFD), a panel-mounted head down display (HDD), a head up display (HUD), or a head mounted display system, such as a "near to eye display" system.

The renderings of the display system 132 may be processed by a graphics system, components of which may be integrated into the display system 132 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Responsive to receiving display commands from the control module 104, the display system 132 displays, renders, or otherwise visually conveys, one or more graphical representations or images associated with operation of the aircraft 100, and specifically, the PAB 34 described in greater detail below. In various embodiments, images displayed on the display system 132 may also be responsive to processed user input that was received via a user input/output device 130.

The user input/output device 130 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. Non-limiting examples of uses for the user input/output device 130 include: entering values for stored variables (FIG. 3, 164), loading or updating instructions and applications (FIG. 3, 160), loading and updating a novel program (FIG. 3, 162), and loading and updating the contents of a database (FIG. 3, 156), each described in more detail below. In addition, pilots or crew may enter flight plans, Standard Operating Procedures (SOP), and the like, via the user input/output device 130. In embodiments using a touch sensitive screen, the user input/output device 130 may be integrated with a display device in display system 132.

External source(s) 146 may comprise air traffic control (ATC), neighboring aircraft, sources of weather information, and other suitable command centers and ground locations. Non-limiting examples of data received from the external source(s) 146 include, for example, instantaneous (i.e., real time or current) air traffic control (ATC) communications, traffic collision and avoidance system (TCAS) data from other aircraft, automatic dependent surveillance broadcast (ADS-B) data, and weather communications. In addition, an external data source 146 may be used to load or program a flight plan into the system 102 (generally, into the flight plan database 124).

In the illustrated embodiment, components within the system 102 communicate with external data source(s) 140 via communications link 147. Communications link 147 may be wireless, utilizing one or more industry-standard wireless communication protocols. Specifically utilizing the communications link 147 are the automatic dependent surveillance broadcast (ADS-B) system 110, and the datalink system 112. The automatic dependent surveillance broadcast (ADS-B) system 110 includes the hardware and software required to transmit and receive digital data communication between the aircraft 100 and other neighboring aircraft. Incoming ADS-B data includes pressure altitude, geometric altitude, horizontal speed, and vertical speed (speeds measured with respect to earth). In various embodiments, the ADS-B system 110 provides information via one or more components of the user interface 108. The datalink system 112 includes the hardware and software required to transmit and receive digital data communications between the aircraft 100 and the external sources 146. Accordingly, it may perform multiple communication protocols. In various embodiments, the datalink system 112 provides controller-pilot communications, i.e., between air traffic control (ATC) and a pilot onboard the aircraft 100 (generally, via one or more components of the user interface 108). The system 102 receives ATC PA commands from the datalink system 112.

As mentioned, the control module 104 performs the functions of: paired approach speed calculations 140, FIMPA processing 142, and display processing 144. The control module 104 performs these functions upon receiving ATC paired approach commands, which include the ASG. In an embodiment of the control module 104, which is depicted in FIG. 3, a processor 150 and a memory 152 (having therein the program 162) form a novel processing engine or unit that performs the processing activities of the system 102, and generates commands for the display system 132, in accordance with the program 162, as is described herein.

The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152 maintains data bits and may be utilized by the processor 150 as storage and/or a scratch pad. The memory locations where data bits are maintained are physical locations that have particular electrical, magnetic, optical, or organic properties corresponding to the data bits. The memory 152 can be any type of suitable computer readable storage medium, such as, various types of: dynamic random access memory (DRAM), SDRAM, static RAM (SRAM), and non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. In various embodiments, a database 156 may be part of the memory 152. The database 156 is computer readable storage media in the form of any suitable type of storage apparatus, including direct access storage devices such as hard disk drives, flash systems, floppy disk drives and optical disk drives. The database 156 may include an aircraft-specific parameters database (comprising aircraft-specific parameters for a variety of aircrafts), an airport database (comprising airport features) and a terrain database (comprising terrain features), parameters and instructions for runway detection and selection, and parameters and instructions for determining speeds and rendering the PAB 134, as described herein. Information in the database 156 may be organized and/or imported from an external data source 146 during an initialization step of a process; it may also be programmed via a user input device 120.

In various embodiments, the processor/memory unit of the control module 104 is additionally communicatively coupled (via a bus 155) to an input/output (I/O) interface 154, and a database 156. The bus 155 serves to transmit programs, data, status and other information or signals between the various components of the control module 104.

The bus 155 can be any suitable physical or logical means of connecting computer systems and components. This includes, but is not limited to, direct hard-wired connections, fiber optics, infrared and wireless bus technologies. The I/O interface 154 enables communications between the control module 104 and other system 102 components, as well as with other external devices 146 not already addressed herein, and as well as within the control module 104, can include one or more network interfaces to communicate with other systems or components. The I/O interface 154 can be implemented using any suitable method and apparatus. For example, the I/O interface 154 supports communication from a system driver and/or another computer system. In one embodiment, the I/O interface 154 obtains data from external data source(s) 140 directly. The I/O interface 154 may also include one or more network interfaces to communicate with technicians, and/or one or more storage interfaces for direct connection to storage apparatuses, such as the database 156.

During operation, the processor 150 loads and executes one or more programs, algorithms and rules embodied as instructions and applications 160 contained within the memory 152 and, as such, controls the general operation of the control module 104 as well as the system 102. In executing the process described herein, the processor 150 specifically loads and executes the instructions embodied in the novel program 162. Additionally, the processor 150 is configured to, in accordance with the program 162: process received inputs (selectively, any combination of input from the set including: external data sources 146, the navigation system 106, the user interface 108, the ADS-B system 110, and the datalink system 112; reference any of the databases (such as, the navigation database 122, and the database 156 for aircraft-specific parameters); determine various speed guidance; and, generate display commands that command and control the display system 132.

Figure 4:
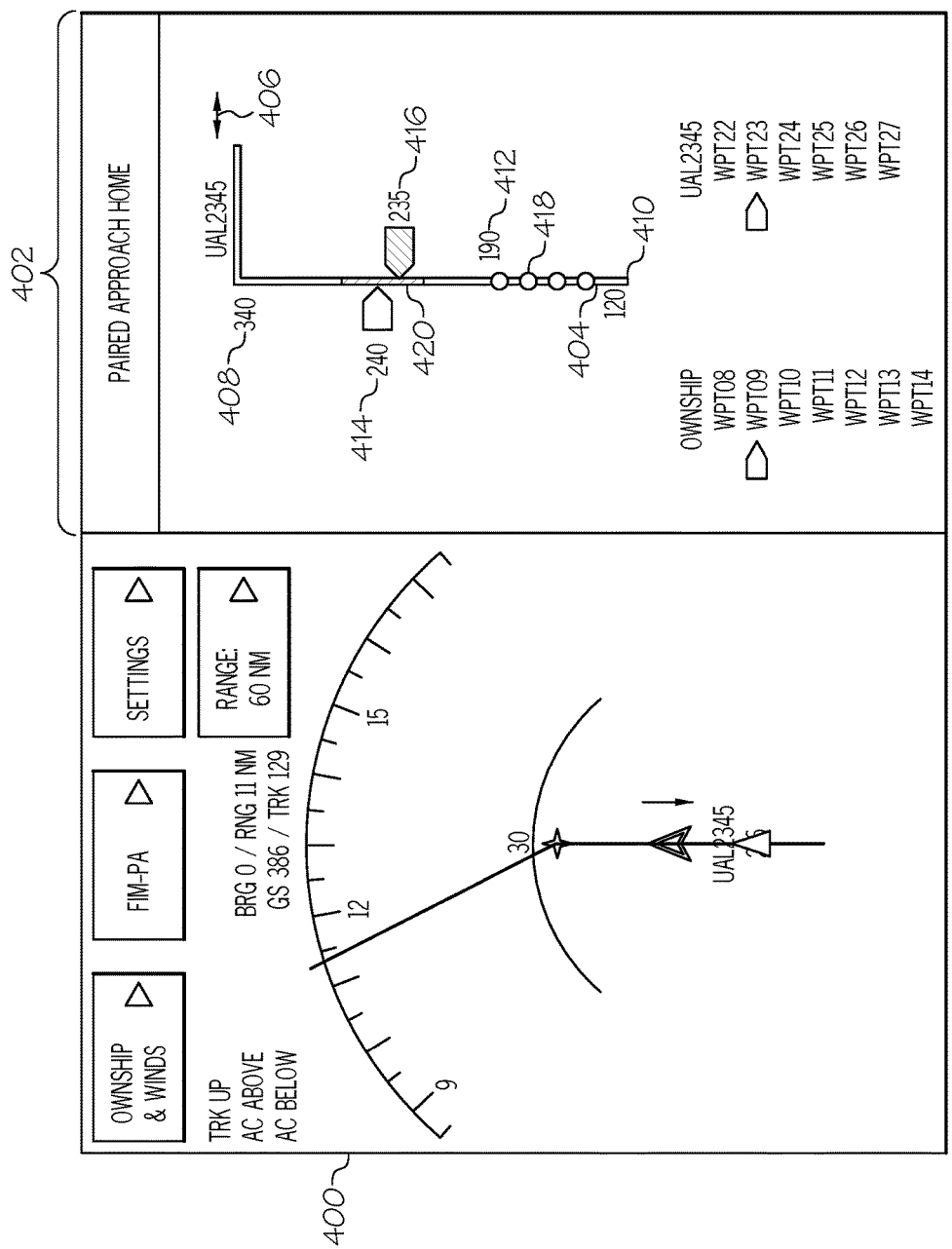
FIGS. 4-7 are flight display images showing the paired approach bar (PAB) in various scenarios, in accordance with an exemplary embodiment.

As mentioned above, the proposed embodiments generate and command a display system 132 to render a paired approach bar (PAB 134) on a cockpit display, and use symbolic indicators to visually communicate trail aircraft 30 speed information and associated key informational items, as related to the target aircraft 26. The indicators are rendered such that they are separate and visually distinguishable from each other. Turning now to FIG. 4 and with continued reference to FIGS. 1-3, a cockpit display 400 is shown having the PAB 404 rendered in an area called the Paired Approach Home 402. Using flight identifying text (UAL2345), a current location of the target aircraft 26 (with respect to the trail aircraft 30) is indicated at the top of the PAB 404. Instantaneous current state data of the trail aircraft 30 is received through the navigation system 106, as described above. A minimum speed 410 (120) associated with a stall of the trail aircraft 30 is determined based in part on aircraft-specific parameters, and is rendered as bounding the bottom of the PAB 404. Target aircraft 26 current state data, which may comprise a four dimensional (4D) trajectory, is continually received by the system 102 and is indicated via an ascending/descending/level-off indicator 406. Target aircraft 26 instantaneous current state data is processed with respective aircraft-specific data to determine a related turbulence/wake and collision risk area. The turbulence/wake and collision risk area (referred to herein as "wake risk" area for simplification purposes) caused by the target aircraft 26 is rendered as the dots from dot 418 down to the minimum speed 410 (120).

Processing the determined wake risk area with aircraft-specific parameters for the trail aircraft 30, various speed guidance are generated, such as, the minimum safe speed 412 (190), which is a minimum speed that the trail aircraft 30 can fly to avoid entering into the wake risk area while aligning for a paired approach (PA). It is to be understood that the minimum safe speed 412 changes responsive to real-time changes in aircraft state data (of the target aircraft 26). On the PAB 404, a PAB safe speed range is rendered as extending from above the minimum safe speed 412 (190) to an aircraft maximum speed 408 (340). Further, the system 102 determines and renders a region 420, which is a target safe speed zone.

A symbol indicating the current speed 414 (of the trail aircraft 30) depicts the current speed 414. In FIG. 4, the current speed 414 is within the PAB safe speed range. When the system 102 determines the current speed 414 should be adjusted, it generates and renders speed guidance, which is a recommended speed 416 (235) displayed as a separate symbol on the PAB 404. The current speed 414 and the recommended speed 416 are overlaid on the PAB 404 on the cockpit display 400 in a visually distinguishable manner to enhance crew awareness about the wake/turbulence area. In an exemplary embodiment, the symbol for the current speed 414 is rendered on the left, and the symbol for the recommended speed 416 is rendered on the right of the PAB 134.

Since current speed 414 (240) is well above the minimum safe speed 412 (190), in various embodiments, the current speed 414 may be indicated in a familiar, universally affirmative color, such as green. Using familiar colors for the indicators helps a crew to visualize the safe zone and reduces his work load during paired approach (PA) procedure execution. The target aircraft identifier and associated ascending/descending/level off information at indicator 406 also enhances pilot awareness and reduces his work load.

Figure 5:
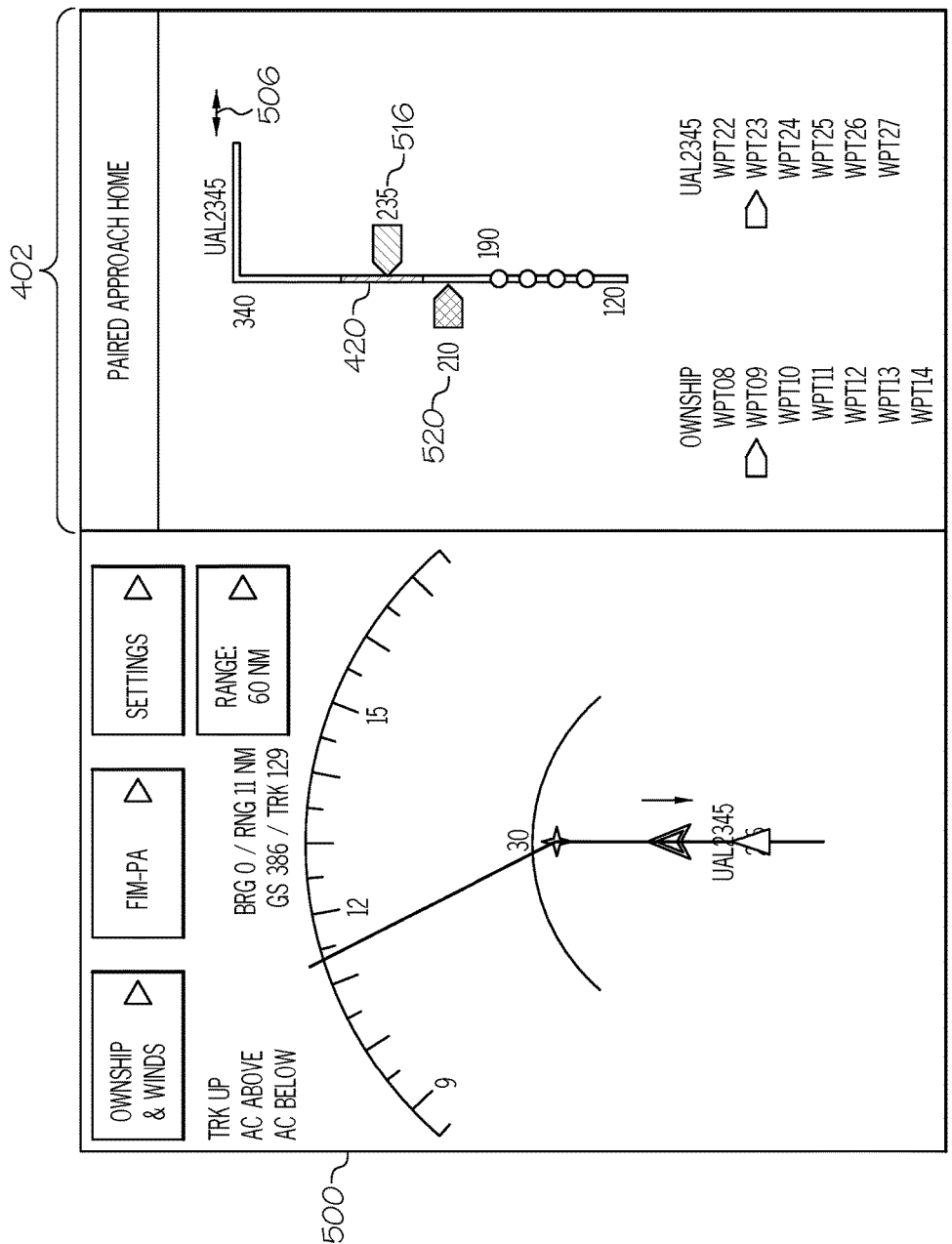
Figure 6:
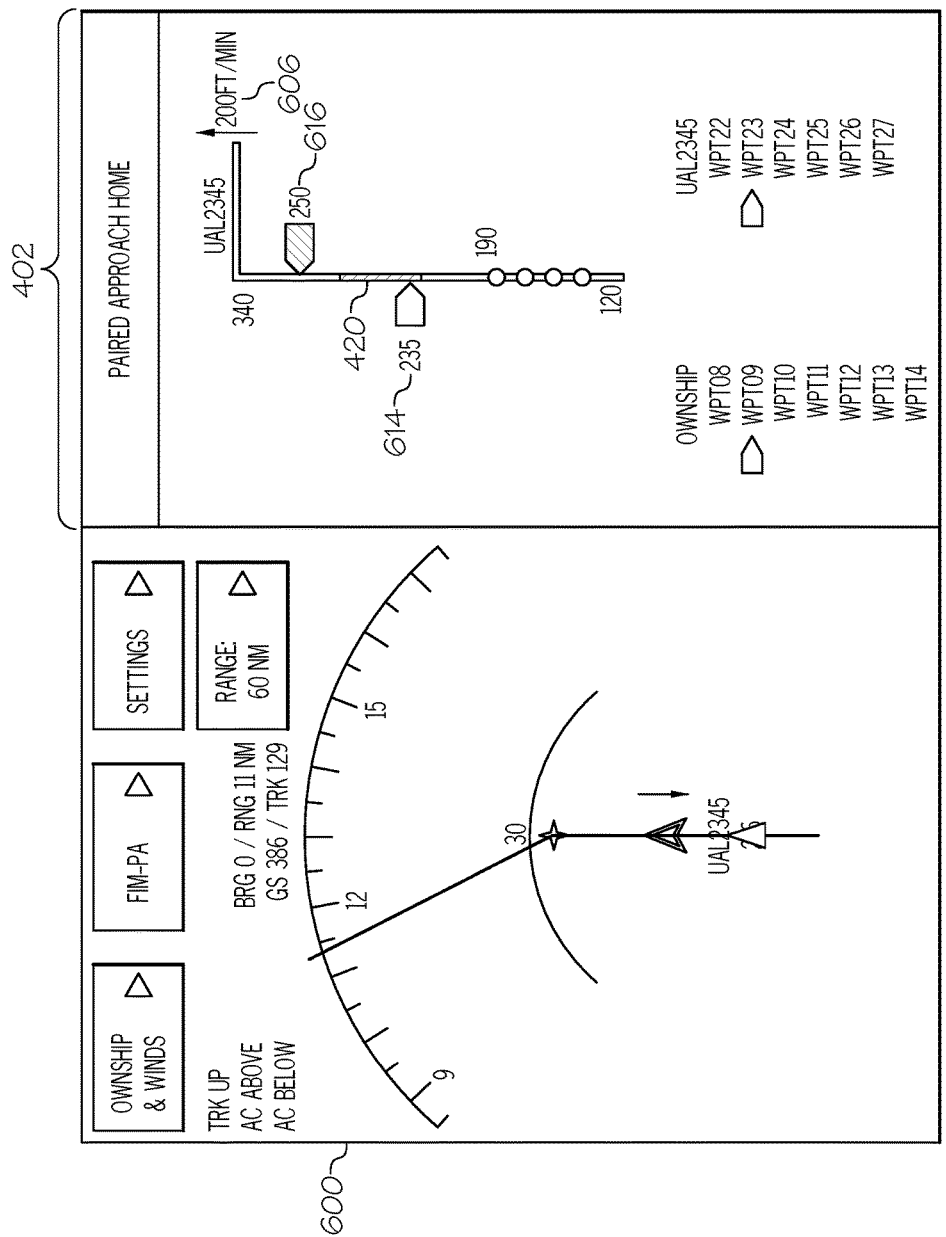
Figure 7:
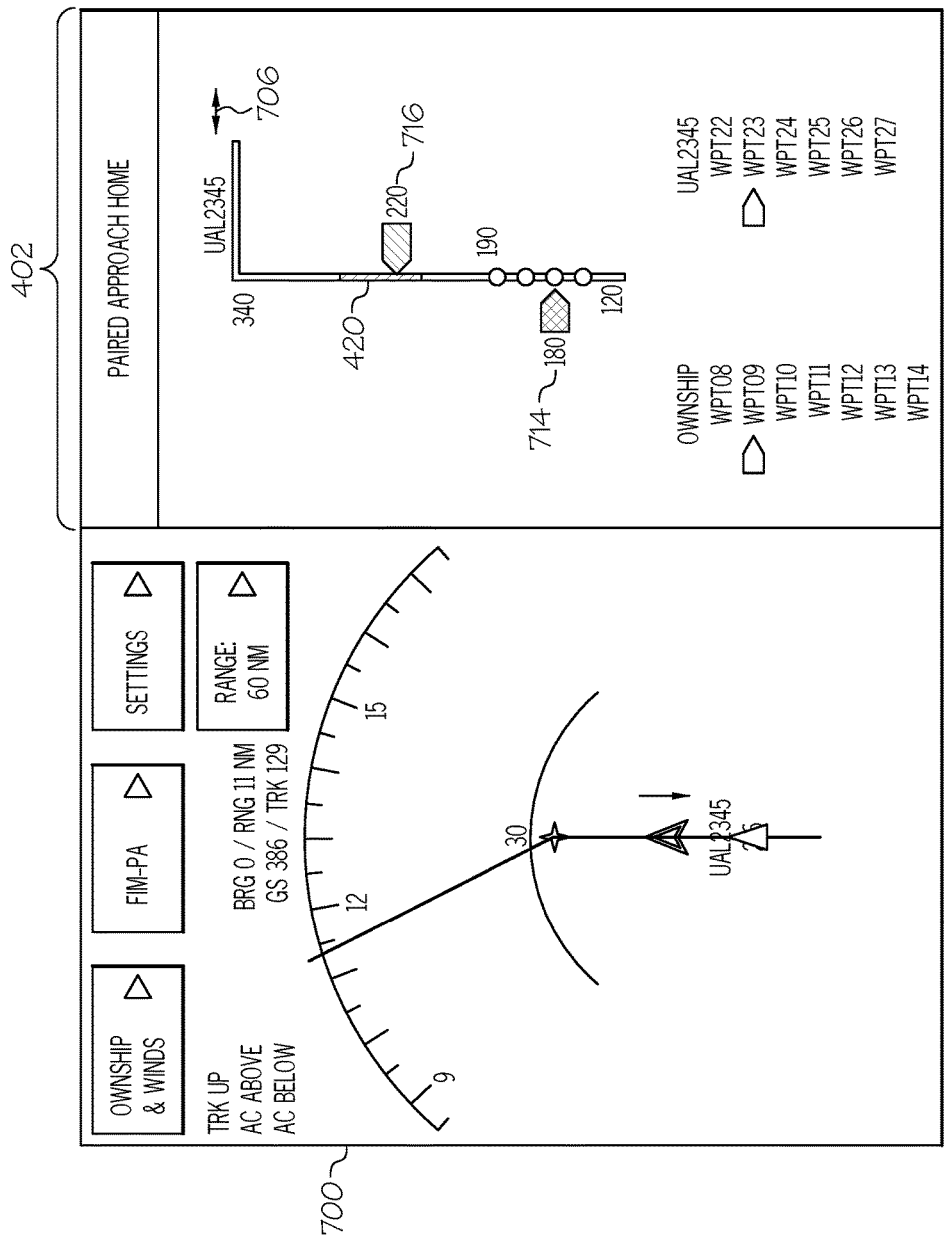

FIGS. 5-7 are provided to illustrate the proposed PAB 404 in various other speed scenarios. In cockpit display 500, the trail aircraft 30 is again trailing the target aircraft 26 (UAL2345), but the trail aircraft 30 current speed 520 (210) is below the recommended speed 516 (235). In practice, such slowing down (of the trail aircraft 30) may be, for example, because of a strong head wind. The current speed 520 is displayed on the PAB 404 in a visually distinguishable manner to alert a pilot that the trail aircraft 30 is about to enter into the wake risk area (turbulence zone). In an embodiment, the current speed 520 may be displayed in a familiar, universal alert color, such as red, to draw the pilot's attention. The speed guidance, recommended speed 516 (235), is also provided to aid the pilot in successfully completing the paired approach.

As stated, a real-time change in the aircraft state data (of the target aircraft 26), results in a real-time change in speed guidance, as shown in FIG. 6. On cockpit display 600, the control module 104 determines that the target aircraft 26 is speeding up or accelerating, and updates the PAB 404 on the Paired Approach Home 402 responsive thereto. The increasing target aircraft 26 speed is visually presented with the upward-pointing arrow and the text "200 FT/MIN" used for the ascending/descending/level-off indicator 606. In practice, the target aircraft 26 may be accelerating or speeding up due to a tail wind. Responsive thereto, the control module 104 determines a new recommended speed 616 for the trail aircraft 30 to successfully complete the paired approach. In this scenario, the symbol for current speed 614 may be rendered in green or in red, depending on whether the current speed 614 is within the safe speed zone 420 when the new recommended speed 616 (250) is determined.

The example shown in cockpit display 700 (FIG. 7) depicts another variation in speed guidance. The control module 104 determines that the trail aircraft 30 has reduced speed too much with respect to the target aircraft 26, and has entered the wake risk area. The PAB 404 on the Paired Approach Home 402 has been updated responsive thereto. In practice, the trail aircraft 30 may have reduced speed responsive to encountering environmental conditions. In this case, the control module 104 renders the symbol for the current speed 714 in the wake risk area of the PAB 404, and may additionally utilize a visual distinguishability technique such as the universal alert color red. As with the previous examples, the recommended speed 716 (220) is based on a combination of the current state data of the trail aircraft 30, the aircraft-specific parameters of the target aircraft 26, and the current state data of the target aircraft 26. In this example, the target aircraft 26 may also have slowed down, as the recommended FIM-PA speed 716 (220) is a slightly lower speed goal than what is rendered in FIG. 4 and FIG. 5 (220 instead of 235).

Accordingly, the exemplary embodiments discussed above provide a technologically improved FIMPA system 102. The FIMPA system 102 provides easily comprehensible, current, visual speed guidance for a trail aircraft 30. The speed guidance distinguishes speeds associated with wake boundaries and aircraft-specific speed boundaries. The FIMPA system 102 determines a recommended speed to achieve the AG 36 based on aircraft-specific parameters and current state data for each of the target aircraft 26 and the trail aircraft 30. The FIMPA system 102 changes the visual presentation of the speed marker symbols to intuitively communicate safe speeds and alert speeds responsive to determining that a recommended speed is different than a current speed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for a paired approach (PA) procedure in a trail aircraft, the method comprising:
   receiving instantaneous target traffic state data from an automatic dependent surveillance-broadcast;
   receiving instantaneous state data of the trail aircraft from a navigation system;
   obtaining aircraft-specific parameters;
   processing the state data of the trail aircraft, target traffic state data, and aircraft-specific parameters to determine a safe speed zone for the trail aircraft to perform a paired approach with a target aircraft, and a recommended speed for the trail aircraft;
   rendering, on a display system, a paired approach bar (PAB) defined, in part, by visually distinguishing each of:
   flight identifying text for the target aircraft;
   a PAB safe trail aircraft speed range extending from above a trail aircraft minimum safe speed to a trail aircraft maximum speed;
   a current trail aircraft speed;

the recommended speed for the trail aircraft; and
a wake risk area caused by the target aircraft, the wake risk area being a range of trail aircraft speeds below the safe speed zone and above a trail aircraft minimum speed.

2. The method of claim 1, wherein target traffic state data comprises a four-dimensional (4D) trajectory.

3. The method of claim 2, wherein aircraft-specific parameters comprise aircraft-specific parameters for the trail aircraft and aircraft-specific parameters for the target aircraft.

4. The method of claim 3, further comprising:
visually distinguishing, on the PAB, the maximum speed of the trail aircraft.

5. The method of claim 4, further comprising visually indicating on the PAB, the trail aircraft minimum speed, the trail aircraft minimum speed being associated with an engine stall of the trail aircraft.

6. The method of claim 5, further comprising visually indicating on the PAB the trail aircraft minimum safe speed.

7. The method of claim 6, further comprising rendering, next to the flight identifying text for the target aircraft, a symbol for a vertical component of movement of the target aircraft, wherein the vertical component of movement of the target aircraft is one of (i) ascending, (ii) descending, and (iii) holding level.

8. A system for flight interval management paired approach (FIMPA), the system comprising:
a database comprising aircraft-specific parameters;
a memory; and
a processor operatively coupled to the memory and the database, the processor configured to:
receive instantaneous target traffic state data;
receive instantaneous state data of a trail aircraft;
process the state data of the trail aircraft, target traffic state data, and aircraft-specific parameters to determine a safe speed zone for the trail aircraft to perform a paired approach with a target aircraft, and a recommended speed for the trail aircraft;
render, on a display system, a paired approach bar (PAB) defined, in part, by visually distinguishing each of:
flight identifying text for the target aircraft;
a PAB safe trail aircraft speed range extending from above a trail aircraft minimum safe speed to a trail aircraft maximum speed;
a current trail aircraft speed; and
the recommended speed for the trail aircraft; and
a wake risk area caused by the target aircraft, the wake risk area being a range of trail aircraft speeds below the safe speed zone and above a trail aircraft minimum speed.

9. The system of claim 8, wherein the processor is further configured to: obtain, from the database, aircraft-specific parameters for the trail aircraft and aircraft-specific parameters for the target aircraft.

10. The system of claim 9, wherein the processor is further configured to render next to the flight identifying text for the target aircraft a symbol for a vertical component of movement of the target aircraft, wherein the vertical component of movement of the target aircraft is one of (i) ascending, (ii) descending, and (iii) holding level.

11. The system of claim 10, wherein target traffic state data comprises a four dimensional (4D) trajectory.

12. The system of claim 11, wherein the processor is further configured to render, on the PAB, a visual indication of the trail aircraft maximum speed.

13. The system of claim 12, wherein the processor is further configured to render, on the PAB, an indicator for the minimum speed of the trail aircraft, the minimum speed being associated with an engine stall.

14. The system of claim 13, wherein the processor is further configured to render, on the PAB, a visual indication of the trail aircraft minimum safe speed.

15. The system of claim 14, wherein the processor is further configured to render the current trail aircraft speed in red upon determining that the current trail aircraft speed is below the minimum safe speed.

\* \* \* \* \*